United States Patent [19]

Fearing et al.

[11] 4,281,071

[45] Jul. 28, 1981

[54] FILLED UNSATURATED POLYESTER RESIN COMPOSITIONS HAVING LOWERED VISCOSITIES

[75] Inventors: Ralph B. Fearing, Bardonia; Jeffrey E. Telschow, Tarrytown; Edward D. Weil, Hastings-on-Hudson, all of N.Y.

[73] Assignee: Stauffer Chemical Company, Westport, Conn.

[21] Appl. No.: 124,877

[22] Filed: Feb. 26, 1980

[51] Int. Cl.³ .............................................. C08K 5/51
[52] U.S. Cl. .................................... 525/2; 260/40 R; 260/42.52
[58] Field of Search ............... 525/2; 260/42.52, 40 R

[56] References Cited

U.S. PATENT DOCUMENTS

| | | | |
|---|---|---|---|
| 2,840,538 | 6/1958 | Minter et al. | 260/40 R |
| 3,344,107 | 9/1967 | Miller | 260/37 R |
| 3,404,023 | 10/1968 | Schrader et al. | 428/446 |
| 3,562,210 | 2/1971 | Cassar et al. | 525/2 |
| 4,192,791 | 3/1980 | Self | 260/40 R |
| 4,200,565 | 4/1980 | Naughton | 260/40 R |
| 4,210,572 | 7/1980 | Herman et al. | 260/40 R |
| 4,211,686 | 7/1980 | Nishikawa et al. | 260/40 R |

FOREIGN PATENT DOCUMENTS

| | | | |
|---|---|---|---|
| 776764 | 1/1968 | Canada . | |
| 47-6415 | 2/1972 | Japan | 525/2 |
| 1088416 | 10/1967 | United Kingdom . | |

OTHER PUBLICATIONS

Chem. Abstract No. 148488x, Viscosity Control of Unsaturated Polyester Composition, 6/75.
Kunststoffe, 68(2), pp. 62–64, 1978, Additives to Reduce the Viscosity of the Up Resin/Aluminum Hydroxide System.
Modern Plastics Encyclopedia, vol. 53, No. 10A, 10/76, pp. 161 and 166, Coupling Agents.

*Primary Examiner*—John Kight, III
*Attorney, Agent, or Firm*—Richard P. Fennelly

[57] ABSTRACT

The viscosity of filled unsaturated polyester resin compositions is reduced by the incorporation in said compositions of an effective amount of an organic phosphite ester for viscosity reduction.

8 Claims, No Drawings

FILLED UNSATURATED POLYESTER RESIN COMPOSITIONS HAVING LOWERED VISCOSITIES

BACKGROUND OF THE INVENTION

1. Field of the Invention

The present invention relates to filled unsaturated polyester resin compositions having lowered viscosities so as to be more processable.

2. Description of the Prior Art

Filled unsaturated polyester resin compositions are well-known commercial products for the manufacture of a variety of products for which either sheet metal or wood has traditionally been used. Some examples include auto bodies, wall panels, and boat hulls. It has been customary to add filler to the polyester resin compositions to reduce the cost of the finished product, to improve the surface appearance of the product, and to improve its water resistance. However, addition of the levels of filler needed to accomplish these results also increases the viscosity of the filled polyester composition rendering it more difficult to process. A number of prior art attempts have been made to decrease the viscosity of filled unsaturated polyester resin compositions by the use of additives.

U.S. Pat. No. 2,840,538 to H. F. Minter et al. advocates the use of: a melamine resin; a soap, such as tall oil; or a fatty acid, such as stearic acid, as coatings for the filler material.

Canadian Patent No. 766,764 advocates the use of a metal salt of an organic acid having from 3 to 18 carbon atoms as a viscosity reduction agent.

Japanese Kokai No. 75/70,493 advocates the use of polystyrene for viscosity reduction.

Kunststoffe 68(2), 62-64 (1978) mentions the testing of approximately one hundred substances as potential viscosity reduction aids in aluminum hydroxide-filled polyester resin systems. The majority of additives were judged to be ineffective for the intended result. Only a few additives were judged to be "fairly effective" including styrene, a surfactant (available as CEFAX-EMULGATOR), an ethoxylated alkylphenol (available as TINOVETIN NR), and triethyl phosphate.

SUMMARY OF THE PRESENT INVENTION

The present invention is a filled unsaturated polyester resin composition having a reduced viscosity which comprises, as major components, a polyester resin, a filler, and an effective amount of an organic phosphite ester for said viscosity reduction.

DESCRIPTION OF PREFERRRED EMBODIMENTS OF THE PRESENT INVENTION

The present invention relates to resinous polyester molding compositions having reduced viscosity characteristics due to the presence of an effective amount of an organic phosphite ester for such viscosity reduction.

The composition of the present invention comprises any of the conventional polymerizable unsaturated polyester resins known to the art. These resins are prepared, for example, by the condensation reaction of an unsaturated polyhydric alcohol and a saturated polycarboxylic acid, by the reaction of a saturated polyhydric alcohol with an unsaturated polycarboxylic acid, or by the reaction of combinations of unsaturated and saturated polyhydric alcohols with unsaturated and saturated polycarboxylic acids. Representative alcohols that can be used to make these resins include ethylene glycol, propylene glycol, diethylene glycol, dipropylene glycol, neopentyl glycol, dibromoneopentyl glycol, and the bis(2-hydroxyethyl) ether of tetrabromobisphenol-A. Representative acids include phthalic, adipic, tetrahydrophthalic, tetrachlorophthalic, tetrabromophthalic, chlorendic, maleic, fumaric, itaconic, succinic, isophthalic, terephthalic, and trimellitic acids. These polyesters will generally also be mixed with one or more copolymerizable materials, such as those containing a vinyl or isopropenyl group attached to an electronegative group, such as phenyl (as in styrene), halogen (as in vinyl chloride), acetoxy (as in vinyl acetate), or carbalkoxy (as in ethyl acrylate or methyl methacrylate). The polyester resin (and optional comonomer(s), if any) is generally present in the composition at from about 90% to about 20%, by weight of the composition.

The fillers which are employed in the present invention include those finely divided (e.g., 20 microns or less in average particle size) materials conventionally used in polyester resin formulations of the type described. They include calcium carbonate, magnesium carbonate, hydrated alumina, silica, aluminum silicate, magnesium oxide, magnesium silicate, talc, iron oxide, diatomaceous earth, the hydrated silicates, mica, kaolin, and bentonite. The amount of filler can range from about 10% to about 80%, by weight of the total composition.

The polyester molding composition may also contain other conventional additives in conventional amounts in order to achieve the most desired properties for the composition. Representative examples include: glass fibers; plasticizers; polymerization inhibitors; thickening agents, for example, delayed action thickening agents, such as magnesia; and the like.

In order to achieve the desired viscosity reduction for the filled polyester compositions of the present invention when they are subjected to mixing during processing, the present invention contemplates the presence of an effective amount of an organic phosphite ester for viscosity reduction. The selected phosphite ester can be advantageously used to pretreat the filler material prior to its addition to the polyester resin composition, for example, by addition in the form of a solution of the phosphite in a low boiling organic solvent, followed by drying or heating to drive off the solvent. The phosphite ester (or solution of phosphite in organic solvent) can also be added to the filled polyester resin mixture as the filler is added or after the addition of the filler, or to the resin substrate itself prior to the art of adding and then dispersing the filler throughout the resin.

The organic phosphite esters which are useful in the present invention are known for other purposes, for example, as coupling agents in epoxy resin glass reinforced laminates (U.S. Pat. No. 3,404,023 to M. E. Schrader et al.) and as inhibitors for ester interchange reactions in unfilled polyester resin compositions to retard viscosity decreases in such systems (British Patent No. 1,088,416). They may be represented by the following formula:

$$(RO)_2PH$$

where R is independently hydrogen, alkyl or aryl, with at least one R group being either alkyl or aryl. Preferred alkyl groups are the $C_1$-$C_{20}$ alkyl groups, and a preferred aryl group is phenyl. Some representative phosphite esters include diethyl phosphite, di-isopropyl phosphite, monobutyl phosphite, dibutyl phosphite, di(2-ethylhexyl)phosphite, dilauryl phosphite, and diphenyl phosphite.

Generally, the amount and particular type(s) of phosphite ester that can be used in the polyester composition, depending upon the type and amount of filler, the type of unsaturated polyester resin, and the type of phosphite ester, will range from about 0.05% to about 2%, preferably from about 0.2% to about 1%, by weight of the filler, in order to produce the desired viscosity reduction effect. In general, use of higher amounts of filler may necessitate the use of larger amounts of phosphite ester viscosity reduction additive. For certain resin/filler combinations (e.g., certain polyester resins in combination with calcium carbonate) some degree of aging of the blend of resin and treated filler may be needed before the blend is processed.

Also, for such resin filler combinations it has been generally found that the higher alkyl group-containing phosphites work most effectively with more fluid polyester resin compositions, e.g., those containing a higher styrene content. Conversely, the lower alkyl phosphites word more effectively with the less fluid polyester resins.

The filled polyester resin compositions of the present invention have a reduced viscosity when subjected to mixing during processing as compared to a similar filled polyester composition which does not contain the phosphite ester viscosity reduction additive.

After the polyester compositions of this invention have been suitably processed, so that the treated filler is dispersed throughout the resin, they can be placed or sprayed onto an appropriate mold in order to form a shaped polymerizable composition in accordance with techniques known to the person of ordinary skill in the art. In order to initiate the polymerization of the unsaturated polyester resin (and any optional comonomers), preparatory to forming the desired endproduct, a vinyl addition type polymerization catalyst (e.g., an azo compound, peroxide, hydroperoxide, perbenzoate, etc.) is present in the composition, preferably by having been added just prior to the molding operation.

The present invention is illustrated by the following Examples.

EXAMPLES 1-10

These Examples illustrate the viscosity reduction effect observed with the use of various organic phosphite esters containing alkyl and aryl groups as the substituent radicals in alumina trihydrate-containing unsaturated polyester resins.

The phosphite esters listed below were tested as viscosity reduction aids at 1%, by weight of the alumina trihydrate filler (unless otherwise shown), in an unsaturated polyester/alumina trihydrate composition comprising 175 parts by weight of alumina trihydrate per 100 parts by weight of polyester resin (available as KOPPERS 1010, unless otherwise shown). The phosphites were added to the filler in the form of a methylene chloride solvent solution containing the phosphite ester, and the treated filler was allowed to dry (to remove the methylene chloride solvent) before the addition of the filler to the polyester resin. The percentage change in average viscosity (after 0, 5 and 10 minutes of testing on the viscometer) for the sample of polyester resin containing treated filler at 25° C. is based on a control formulation containing filler that was not treated with the phosphite ester additive.

| Example No. | Phosphite Ester Additive | Percentage Change in Average Viscosity |
|---|---|---|
| 1 | Diethyl phosphite | −19 |
| 2 | Diisopropyl phosphite | −23 |
| 3 | Dibutyl phosphite | −65 |
| 4 | Dibutyl phosphite | −54[1] |
| 5 | Dibutyl phosphite | −25[2] |
| 6 | Dibutyl phosphite | −32[3] |
| 7 | Monobutyl phosphite[4] | −13 |
| 8 | Di(2-ethylhexyl) phosphite | −32 |
| 9 | Di(2-ethylhexyl) phosphite | −48[1] |
| 10 | Diphenyl phosphite | −28 |

[1] 0.5 wt. % of the additive was used, rather than 1.0 wt. %.
[2] a different polyester resin was used (PARAPLEX 19).
[3] a different polyester resin was used (REICHHOLD 90-775).
[4] prepared by allowing equimolar amounts of dibutyl phosphite and water to stand at room temperature for one week followed by vacuum distillation to remove the solvent.

EXAMPLE NOS. 11-21

These Examples illustrate the results that were obtained by using dilauryl phosphite as the viscosity reduction additive in various calcium carbonate-filled polyester resin compositions at various concentrations after the filled resins had been allowed to stand for various periods of time before testing.

Solutions of dilauryl phosphite were prepared in methylene chloride. These solutions were stirred with calcium carbonate filler (SYLACAUGA 88B) to form a smooth cream which was allowed to dry. The dried, treated filler material was then added to the selected polyester resin, and the viscosity was determined:

| Example No. | Polyester Resin* | Filler (pbw) to 100 pbw Resin | Percent Phosphite (on Filler) |
|---|---|---|---|
| 11 | REICHHOLD 90-775 | 200 | 0.27 |
| 12 | REICHHOLD 90-775 | 200 | 0.27 |
| 13 | REICHHOLD 90-775 | 200 | 0.27 |
| 14 | REICHHOLD 90-775 | 200 | 0.54 |
| 15 | REICHHOLD 90-775 | 200 | 0.54 |
| 16 | REICHHOLD 90-775 | 200 | 0.54 |
| 17 | KOPPERS 1010 | 150 | 0.27 |
| 18 | KOPPERS 1010 | 150 | 0.27 |
| 19 | KOPPERS 1010 | 150 | 0.54 |
| 20 | KOPPERS 1010 | 150 | 0.54 |
| 21 | KOPPERS 1010 | 150 | 0.54 |

*The REICHHOLD brand polyester resin was more fluid than the KOPPERS brand and was able to contain a higher loading of filler.

| Example No. | Degree of Thixotropy* | Time to Measure |
|---|---|---|
| 11 | None | <1 hr. |
| 12 | None | 18 hrs. |
| 13 | None | 2 days |
| 14 | None | <1 hr. |
| 15 | None | 3 days |
| 16 | None | 1 week |
| 17 | Moderate | 16 hrs. |
| 18 | Moderate | 2 days |
| 19 | Strong | <1 hr. |
| 20 | Strong | 3 days |
| 21 | Strong | 1 week |

*In Example Nos. 17-21 the control formulation which did not contain the organic phosphite compound exhibited non-thixotropic behaviour.

| Example No. | Average Viscosity Speed Range | Percent Change in Viscosity |
|---|---|---|
| 11 | 29,300/3-12 | 0 |
| 12 | 22,800/3-12 | −21 |
| 13 | 21,800/3-12 | −25 to −32 |
| 14 | 34,000/3-12 | +17 |
| 15 | 22,700/3-12 | −22 |
| 16 | 18,600/3-12 | −36 to −45 |
| 17 | 52,000/3-12 | +11 |
| 18 | 49,000/3-12 | +2 |
| 19 | 76,000/3-6 | +65 |
| 20 | 56,000/3-12 | +20 |
| 21 | 53,000/3-12 | +10 |

These data illustrate that, in general, the aging of calcium carbonate/polyester resin blends treated with dilauryl phosphite enhances the viscosity reduction effect. The relatively high alkyl-group-containing dilauryl phosphite tested in Examples 11-21 performed better in a more fluid polyester resin (REICHHOLD 90-775 brand) as compared to a less fluid resin (KOPPERS 1010 brand).

EXAMPLES 22-26

These Examples illustrate the effect of utilizing di(2-ethylhexyl)phosphite as a viscosity depressant additive by various modes of addition.

In Example 22, the calcium carbonate filler (ATOMITE from Thompson, Weinman Co.) was first treated with a methylene chloride solution containing di(2-ethylhexyl)phosphite to give a 0.4%, by weight, add-on of phosphite to the filler after solvent evaporation. Two parts by weight of treated filler was added to one part by weight of resin (REICHHOLD 90-775) to give a 200 phr loading of treated filler. The viscosity was determined after suitable aging as shown below.

Example 23 was the same as Example 22 with the exception that the filler and phosphite combinations was dried prior to addition to the resin.

In Example 24, the phosphite solution was added to the resin, rather than the filler, at the 0.4 wt. % level based on filler.

In Example 25, the phosphite was added to the filler, as in Example 22, but the amount was doubled to 0.8%, by weight, from 0.4%.

Example 26, the procedure of Example 25 was followed with the exception that additional untreated calcium carbonate was added (2.4 parts by weight per 200 parts by weight of resin) in order to distinguish a true surface effect for the phosphite on the filler from a liquid dilution effect.

No thixotropic effects were noted in any of the systems that were tested.

The results were:

| Example No. | Age of Slurry (in days) | Aver. Visc. (at 6-30 rpm.) | Percent Change from Control |
|---|---|---|---|
| 22 | 5 | 12,300 | −30 |
| 23 | 5 | 13,200 | −24 |
| 24 | 3 | 17,300 | 0 |
| 25 | 3 | 11,900 | −32 |
| 26 | 3 | 13,600 | −22 |

These data illustrate that addition of the phosphite to the filler results in improved viscosity effects, but that such effects were not noted when the phosphite was added to the resin at the 0.4 wt. % level, based on the weight of filler (Example 24).

In another run, Example 23 was repeated with the exception that the filler was predried prior to addition of the phosphite ester. The treated filler was then added to the resin. The Table given below sets forth the percentage change in viscosity at 6 and 12 rpm both before and after aging of the resin/treated filler slurry:

| RPM | Age of Slurry (in days) | Percent Change from Control |
|---|---|---|
| 6 | 0 | +22.5 |
| 6 | 2 | +1 |
| 12 | 0 | +20 |
| 12 | 2 | +6 |

EXAMPLES 27-31

These Examples show the effect of di(2-ethylhexyl) phosphite and dibutyl phosphite in calcium carbonate (ATOMITE)-filled polyesters. The phosphites were added in the form of methylene chloride solutions as previously described.

| Example No. | % Phosphite on Filler | Phr Filler on Resin | Resin Type | Average Viscosity | Thixotropy | Percent Change in Viscosity |
|---|---|---|---|---|---|---|
| 27 | 0.4 | 150 | PARAPLEX 19 | 15,900 | No | −45 |
| 28 | 0.8 | 150 | KOPPERS 1010 | 37,100 | No | −11 |
| 29 | 0.25 | 150 | PARAPLEX 19 | 21,200 | Yes | −27 |
| 30 | 0.25 | 200 | REICHHOLD 90-775 | 24,700 | No | +39 |
| 31 | 0.51 | 200 | REICHHOLD 90-775 | 19,200 | No | +8 |

In the above Examples, di(2-ethylhexyl)phosphite was used in Example Nos. 27-28, whereas dibutyl phosphite was used in Example Nos. 29-31.

These data illustrate that dibutyl phosphite and di(2-ethylhexyl)phosphite were effective viscosity reduction additives for 150 phr of calcium carbonate at 0.25-0.8% by weight of filler (Example Nos. 27-29), but that when the amount of filler was raised to 200 phr, the use of similar amounts of dibutyl phosphite was not effective (Example Nos. 30-31).

The REICHHOLD brand polyester resin was more fluid than either the KOPPERS or PARAPLEX brands and contained a higher loading of filler.

EXAMPLE 32

This Example illustrates the reduction of viscosity in a calcium carbonate filled unsaturated polyester resin formulation containing di(2-ethylhexyl)phosphite.

Di(2-ethylhexyl)phosphite (0.71 gm.) was dissolved in methylene chloride (120 ml.). The resulting solution was mixed with 180 gm. of calcium carbonate filler (ATOMITE, from Thompson, Weinman and Company) to form a uniform creamy suspension. The methylene chloride solvent was allowed to evaporate so as to leave a 0.4%, by weight, impregnation of the phosphite on the filler.

The treated filler was added at 200 parts by weight of filler to 100 parts by weight of unsaturated polyester resin (REICHHOLD 90-775). The viscosity of the resulting composition was measured on a Brookfield viscometer (No. 4 spindle at 6 and 12 rpm.) to yield an average viscosity of 12,700 cps. as compared to a viscosity of 17,700 cps. for a control sample containing untreated filler. This represented a reduction in the viscosity of about 28% with use of the present invention.

EXAMPLE 33

This Example illustrates the use of dilauryl phosphite as a viscosity reduction additive in accordance with the present invention.

Dilauryl phosphite (250 mg.) was dissolved in about 50 cc. of methylene chloride. The resulting solution was then mixed with 100 gm. of calcium carbonate filler (SYLACAUGA 88B) to give 0.25%, by weight, of phosphite on the filler. The treated filler was allowed to dry to remove the methylene chloride solvent and was reground.

The treated filler (60.7 gm.) was added to about 30.3 gm. of an unsaturated polyester resin (REICHHOLD 90-775), and the viscosity of the resulting composition was determined at 25° C. It had an average viscosity of 10,200 cps. as compared to a control sample containing untreated filler which had an average viscosity of 22,500 cps. The viscosity control additive of the present invention produced a reduction in the average viscosity of the sample of nearly 55% as compared to the average viscosity of the control sample.

EXAMPLE 34

This Example illustrates the viscosity reduction effect of dibutyl phosphite when added to the unsaturated polyester resin prior to addition of alumina trihydrate filler.

Unsaturated polyester resin (40 gm.), available under the tradename KOPPERS 1010, was treated with 0.7 gm. of dibutyl phosphite. To the treated resin was then added 69.3 gm. of alumina trihydrate filler. The resulting mixture simulated a 1%, by weight, treatment of the alumina trihydrate at 175 parts of filler per 100 parts by weight of resin. An analogous control sample was also prepared by adding filler to untreated resin. The sample prepared from the dibutyl phosphite-treated resin showed a 53% reduction in average viscosity as compared to the average viscosity of the control formulation.

EXAMPLE 35

This illustrates the viscosity reduction effect of di(2-ethylhexyl)phosphite in calcium carbonate-filled polyester resins.

Ten pound samples of calcium carbonate filler (SNO-FLAKE P-3587 from Thompson, Weinman Co.) were impregnated with 0.5%, by weight of the filler, of di(2-ethylhexyl)phosphite as previously described in Examples 11–21, for example. The treated filler was added to REICHHOLD 90-775 polyester resin at 200 phr. The viscosity of the resin containing the treated filler was 10,500 cps. at 25° C. A control sample showed a viscosity of 15,700 cps. Therefore the use of the present invention resulted in a reduction of about 32% in the viscosity of the sample as compared to the control.

The foregoing Examples are merely illustrative of the present invention and should not be construed in a limiting sense. The scope of protection that is sought is set forth in the claims which follow.

We claim:

1. A filled unsaturated polyester resin composition which comprises an unsaturated polyester resin, a filler, and an effective amount of an organic phosphite ester having the formula

where R is independently selected from the group consisting of hydrogen, alkyl, and aryl, with the proviso that at least one R is either alkyl or aryl for reduction of the viscosity of the composition.

2. A composition as claimed in claim 1 where the alkyl group is a $C_1$–$C_{20}$ alkyl group and the aryl group is a phenyl group.

3. A composition as claimed in claim 1 wherein the phosphite ester is selected from the group consisting of diethyl phosphite, diisopropyl phosphite, monobutyl phosphite, dibutyl phosphite, di(2-ethylhexyl)phosphite, dilauryl phosphite, and diphenyl phosphite.

4. A composition as claimed in claim 1 wherein the polyester resin is present at from about 90% to about 20%, by weight of the composition.

5. A composition as claimed in claim 1 wherein the filler is present at from about 10% to about 80%, by weight of the composition.

6. A composition as claimed in claim 5 wherein the filler is selected from the group consisting of calcium carbonate and hydrated alumina.

7. A composition as claimed in either claim 1, 2, 3, 4, 5, or 6 in which the phosphite ester is present at from about 0.05% to about 2%, by weight of the filler.

8. A composition as claimed in either claim 1, 2, 3, 4, 5, or 6 in which the phosphite ester is present at from about 0.2% to about 1%, by weight of the filler.

* * * * *

UNITED STATES PATENT AND TRADEMARK OFFICE
CERTIFICATE OF CORRECTION

PATENT NO. : 4,281,071

DATED : July 28, 1981

INVENTOR(S) : Ralph B. Fearing et al.

It is certified that error appears in the above—identified patent and that said Letters Patent are hereby corrected as shown below:

Col. 1, line 31, "No. 766,764" should be -- No. 776,764;

Col. 3, line 26, "word" should be -- work --;

Col. 4, line 14, the percent change in average viscosity for Example No. 8 should be -- -52 -- rather than "-32"; and Col. 5, line 39, "combinations" should be -- combination --.

Signed and Sealed this

Eighth Day of December 1981

[SEAL]

Attest:

Attesting Officer

GERALD J. MOSSINGHOFF

Commissioner of Patents and Trademarks